（12）United States Patent
Osogami et al.

(10) Patent No.: US 9,223,636 B2
(45) Date of Patent: Dec. 29, 2015

(54) LOW-RISK SERVER CONSOLIDATION

(71) Applicant: INTERNATIONAL BUSINESS MACHINES CORPORATION, Armonk, NY (US)

(72) Inventors: Takayuki Osogami, Kanagawa-ken (JP); Hiroki Yanagisawa, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 13/736,639

(22) Filed: Jan. 8, 2013

(65) Prior Publication Data
US 2014/0196027 A1    Jul. 10, 2014

(51) Int. Cl.
G06F 9/455    (2006.01)
G06F 9/50     (2006.01)

(52) U.S. Cl.
CPC .......... G06F 9/5077 (2013.01); G06F 9/45558 (2013.01); G06F 2009/4557 (2013.01)

(58) Field of Classification Search
None
See application file for complete search history.

(56) References Cited

U.S. PATENT DOCUMENTS

2011/0173327 A1*  7/2011  Chen et al. ............... 709/226
2011/0191461 A1*  8/2011  Dasgupta et al. ......... 709/224
2011/0302578 A1* 12/2011  Isci et al. .................. 718/1
2012/0131591 A1*  5/2012  Moorthi et al. ........... 718/104
2012/0198447 A1    8/2012  Osogami et al.
2012/0317573 A1   12/2012  Osogami et al.
2013/0326506 A1* 12/2013  McGrath et al. .......... 718/1

FOREIGN PATENT DOCUMENTS

| JP | 64002145     | 1/1989  |
| JP | 3543441 B2   | 7/2004  |
| JP | 2009123174   | 6/2009  |
| JP | 2009237859   | 10/2009 |
| JP | 2010009160   | 1/2010  |
| JP | 4557178 B2   | 10/2010 |
| JP | 2010237787   | 10/2010 |
| JP | 2010244181   | 10/2010 |
| JP | 2010271863   | 12/2010 |
| WO | WO2007136021 | 11/2007 |

OTHER PUBLICATIONS

Bichler, M., et al. "Capacity Planning for Virtualized Servers" 16th Annual Workshop on Information Technologies & Systems (WITS). 2006. (6 Pages).

* cited by examiner

Primary Examiner — Dong Kim
(74) Attorney, Agent, or Firm — Tutunjian & Bitetto, P.C.; Vazken Alexanian

(57) ABSTRACT

A method for virtual machine (VM) consolidation includes providing a plurality of resource usage levels for a set of VMs to be consolidated including a first resource usage level and a last resource usage level. An optimization problem is formulated to minimize an objective function such that any of one or more VMs of a set of VMs to be allocated to a target server may be assigned to the first resource level and remaining VMs of the set may be assigned to the last resource level while not exceeding a resource capacity of the target server. The set of VMs are allocated to a number of servers is accordance with the formulating to consolidate the set of VMs.

14 Claims, 4 Drawing Sheets

400

```
┌─────────────────────────────────────────────────────────┐
│ Providing a plurality of resource usage levels for a    │
│ set of VMs to be consolidated including a first         │
│ resource usage level and a last resource usage level    │
│                         402                             │
└─────────────────────────────────────────────────────────┘
                            │
                            ▼
┌─────────────────────────────────────────────────────────┐
│ Formulating an optimization problem to minimize an      │
│ objective function based upon the plurality of          │
│ resource usage levels                                   │
│                         404                             │
│  ┌───────────────────────────────────────────────────┐  │
│  │ Formulating the optimization problem such that    │  │
│  │ any of one or more VMs of a set of VMs to be      │  │
│  │ allocated to a target server may be assigned to   │  │
│  │ the first resource level and remaining VMs of the │  │
│  │ set may be assigned to the last resource level    │  │
│  │ while not exceeding a resource capacity of the    │  │
│  │ target server                                     │  │
│  │                        406                        │  │
│  └───────────────────────────────────────────────────┘  │
└─────────────────────────────────────────────────────────┘
                            │
                            ▼
┌─────────────────────────────────────────────────────────┐
│ Allocating the set of VMs to the number of servers in   │
│ accordance with the formulating to consolidate the      │
│ set of VMs                                              │
│                         408                             │
└─────────────────────────────────────────────────────────┘
```

FIG. 4

LOW-RISK SERVER CONSOLIDATION

BACKGROUND

1. Technical Field

The present invention relates to virtual machines, and more particularly to virtual machine consolidation.

2. Description of the Related Art

A virtual machine (VM) is a software implementation of a machine (i.e., computer) that executes programs like a physical machine In server consolidation, VMs are consolidated into servers so as to efficiently reduce the total number of servers. The goal is to consolidate more VMs into a single server. By turning off inactive servers, power and cooling costs can be reduced.

In one conventional approach, the required CPU usage for each VM is defined as the maximum CPU usage. However, typical CPU usage history is very "spiky." In other words, CPU usage is usually low and occasionally becomes very high for a very short period of time. If the maximum CPU usage is defined as the required CPU usage of a VM, the CPU usage of the VM will often be overestimated.

In another conventional approach, the required CPU usage for each VM is defined as the 98th percentile of CPU usage history. This approach avoids the overestimation problem associated with defining the required CPU usage $u_i$ as the maximum CPU usage. However, this approach may lose information at the maximum CPU usage.

SUMMARY

A method for virtual machine (VM) consolidation includes providing a plurality of resource usage levels for a set of VMs to be consolidated including a first resource usage level and a last resource usage level. An optimization problem is formulated, using a processor, to minimize an objective function such that any of one or more VMs of a set of VMs to be allocated to a target server may be assigned to the first resource level and remaining VMs of the set may be assigned to the last resource level while not exceeding a resource capacity of the target server. The set of VMs are allocated to a number of servers is accordance with the optimization problem to consolidate the set of VMs.

A non-transitory computer readable storage medium comprises a computer readable program for virtual machine (VM) consolidation. The computer readable program when executed on a computer causes the computer to perform the following steps. A plurality of resource usage levels are provided for a set of VMs to be consolidated including a first resource usage level and a last resource usage level. An optimization problem is formulated to minimize an objective function such that any of one or more VMs of a set of VMs to be allocated to a target server may be assigned to the first resource level and remaining VMs of the set may be assigned to the last resource level while not exceeding a resource capacity of the target server. The set of VMs are allocated to a number of servers is accordance with the optimization problem to consolidate the set of VMs.

A system for virtual machine (VM) consolidation includes a formulation module configured to formulate an optimization problem on a non-transitory computer readable storage medium to minimize an objective function based upon a plurality of resource usage levels including a first resource usage level and a last resource usage level. The optimization problem is formulated such that any of one or more VMs of a set of VMs to be allocated to a target server may be assigned to the first resource level and remaining VMs of the set may be assigned to the last resource level while not exceeding a resource capacity of the target server. An allocation module is configured to allocate the set of VMs to a number of servers is accordance with the optimization problem to consolidate the set of VMs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block/flow diagram showing a system/method for virtual machine packing, in accordance with one illustrative embodiment.

DETAILED DESCRIPTION OF PREFERRED EMBODIMENTS

Figure 1:
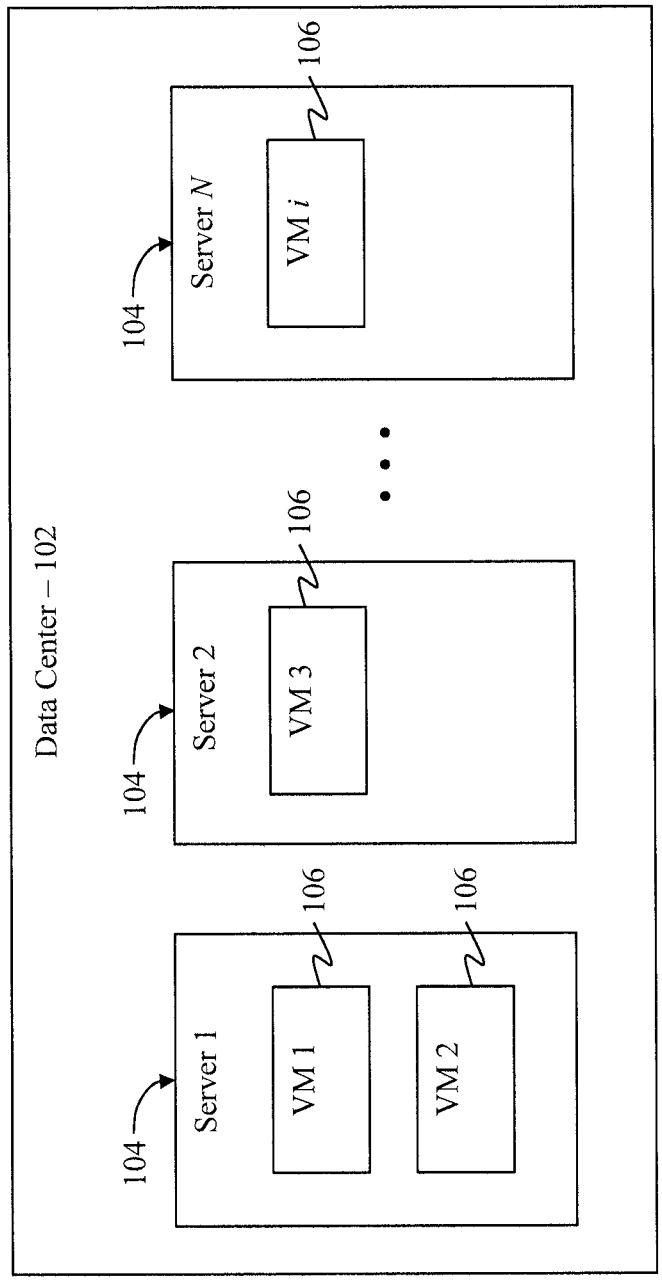
FIG. 1 is a block/flow diagram showing a data center including a number of servers and virtual machines, in accordance with one illustrative embodiment.

In accordance with the present principles, systems and methods of low-risk server consolidation are provided. The present principles allocate a plurality of virtual machines (VMs) over a plurality of servers based upon a minimization of an objective function. Advantageously, a plurality of resource levels is provided for each VM to be allocated. Resources may include, e.g., processor usage, disk input/output bandwidth, network bandwidth, etc. Preferably, the plurality of resource levels includes a first and a second resource level; however, additional resource levels are also contemplated.

An optimization problem is formulated to allocate VMs over a plurality of servers to, for example, minimize the number of servers that the VMs are to be allocated on, minimize total energy usage of the servers, etc. The optimization problem preferably includes a mixed integer programming problem; however, other formulations are also contemplated. The optimization problem is formulated such that any of the one or more VMs to be allocated to a target server may be assigned to the first resource level and remaining VMs to be allocated to the target server may be assigned to the second resource level while not exceeding the target server's resource capacity.

The VMs are allocated to the number of servers in accordance with the formulation. Allocation may include applying a solver to solve the, e.g., MIP problem. Advantageously, the present principles provide an efficient allocation of VMs over a minimum number of servers to reduce over-provisioning of servers, resulting in a reduction in energy consumption, while also accounting for maximum resource usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram showing a data center 100 is illustratively depicted in accordance with one illustrative embodiment. The data center 102 may include any number of servers or hosts 104. The servers 104 may be in electronic communication with each other in a Local Area Network (LAN). The LAN may use Ethernet cables and switches. The servers 104 may be configured to run a number of VMs 106. In accordance with the present principles, VMs are efficiently packed into servers 104, reducing operating costs.

Figure 2:
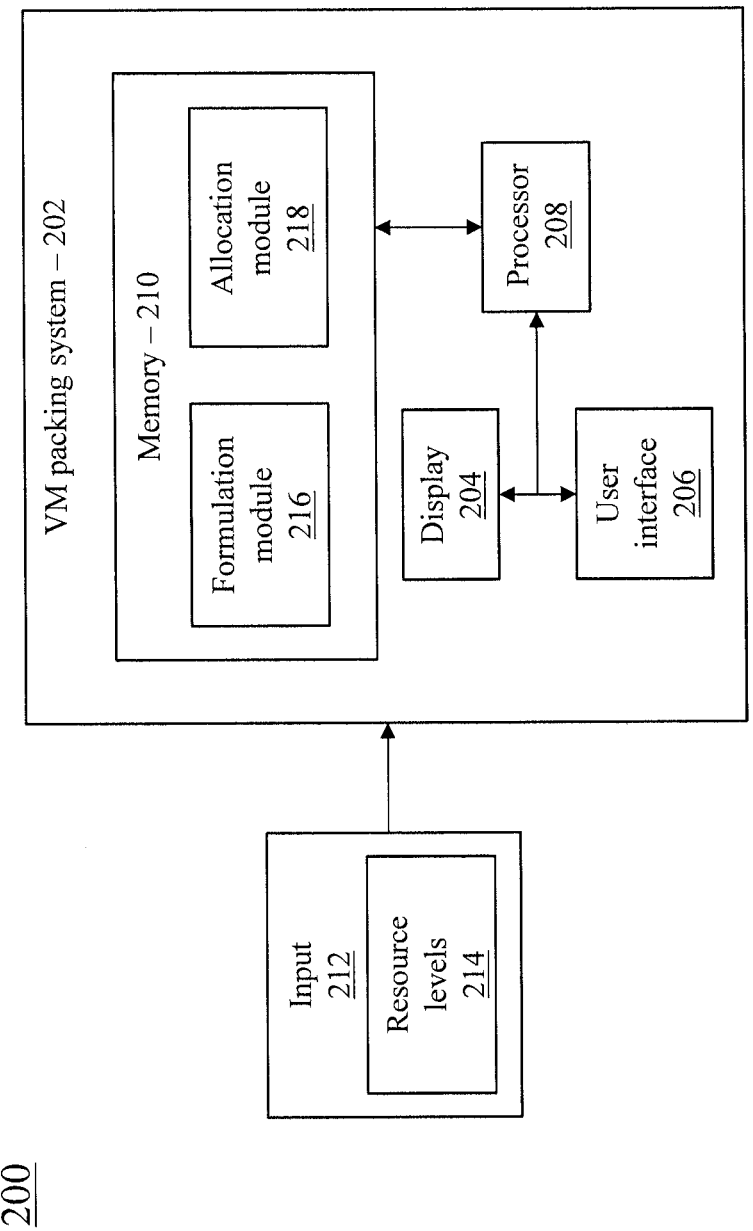
FIG. 2 is a block/flow diagram showing a system/method for virtual machine packing, in accordance with one illustrative embodiment.

Referring now to FIG. 2, a block/flow diagram showing a system 200 for VM packing is illustratively depicted in accordance with one embodiment. VM packing or consolidation allows hosting multiple VMs on a single physical server. It is noted that while the present principles may be described in terms of VMs, the present principles are much broader and may be applicable to any type of packing problem. For example, the present principles may be applied for allocating television advertisements into fixed length commercial breaks. Other applications are also contemplated within the scope of the present principles.

A VM packing system may include a workstation or system 202. The system 202 may be an administrative host or server in a data center. The system 202 preferably includes one or more processors or central processing units (CPUs) 208 and memory 210 for storing applications, modules and other data. The memory 210 may include a variety of computer readable media. Such media may include any media that is accessible by the system 202, and includes both volatile and non-volatile media, removable and non-removable media.

System 202 may include one or more displays 204 for viewing. The displays 204 may permit a user to interact with the system 202 and its components and functions. This may be further facilitated by a user interface 206, which may include a mouse, joystick, or any other peripheral or control to permit user interaction with the system 202 and/or its devices. It should be understood that the components and functions of the system 202 may be integrated into one or more systems or workstations.

The system 202 receives an input 212, which includes a plurality of resource levels 214. Resource levels 214 represent levels of a particular resource that is to be allocated to each VM. Resource levels 214 may represent any resource, such as, e.g., CPU usage, disk input/output bandwidth, network bandwidth, etc.

The resource levels 214 preferably include first and second resource levels, however the resource levels 214 may include any number of resource levels. For example, resource levels 214 may include first, second and third resource levels. Additional resource levels are also contemplated.

In one embodiment, the value of the first resource level includes the maximum resource usage for its respective VM and the level of the second resource level includes the 98th percentile of the maximum resource usage of its respective VM. It should be understood that other resource level values may also be applied in accordance with the present principles, such as, e.g., the 95th percentile of resource usage, etc.

Memory 210 may include formulation module 216 configured to formulate an objective function. Formulating an objective function may include formulating an objective function to minimize a number of servers, to minimize total energy usage, etc. Other applications are also contemplated. Resource levels are allocated to each VM i in a set of VMs to be consolidated. In a preferred embodiment, the first resource level m, is allocated to one VM while a second resource level u, is allocated to the remaining VMs of the set. The assumption is that since resource usage is typically low and only peaks for a very short time, only a few (e.g., one) VM at a time will peak. It should be understood that the allocation of the first resource level is not limited to only one VM. Rather, the first resource level may be allocated to any number of VMs (e.g., two VMs), while the second resource level is allocated to the remaining VMs.

In a preferred embodiment, the formulation module 216 formulates a mixed integer programming (MIP) problem. For example, an MIP problem may be formulated to account for multiple resource levels, including the first resource level $m_i$ and the second resource level $u_j$. An exemplary MIP formulation is shown in equation (1) in accordance with the present principles to minimize a number of servers j used by VMs i.

$$\min \sum_{j \in S} y_j \quad (1)$$

$$\text{s.t.} \quad z_j + \sum_{i \in V} u_i x_{ij} \le C_j y_j \; \forall \; j$$

$$z_j \ge (m_i - u_i) x_{ij} \; \forall \; i, j$$

$$\sum_{j \in S} x_{ij} = 1 \; \forall \; i$$

$$x_{ij} \in \{0, 1\},$$

$$y_j \in \{0, 1\},$$

$$z_j \ge 0$$

where $x_{ij}$ is a binary decision variable that equals 1 if a VM i is allocated to a server j, $y_j$ is a binary decision variable that equals 1 if the server j accommodates at least one VM (i.e., server j is in use), $z_j$ is a continuous variable, $m_i$ and $u_i$ indicates first and second resource (e.g., CPU) levels for each VM i, and $C_j$ is the resource capability of server j.

The objective function of equation (1) minimizes the total number of servers j that are used. Equation (1) is subject to a number of constraints. The combination of the first two constraints of equation (1) ensure that at most one VM at a time can use the first resource level m, while the remaining VMs use the second resource level $u_i$.

It should be understood that the present principles are not limited to the above MIP problem. For example, the present principles may be implemented to minimize total energy usage such that the MIP problem is formulated as $$\min \sum_{j \in S} w_j y_j$$

where $w_j$ is set to the power consumption of server j. Other formulations and implementations are also contemplated.

Memory 210 may include allocation module 218 configured to allocate VMs onto servers in accordance with the formulation. This may include solving the formulation of the VM packing. The formulation may be solved by using any number of known solvers. For example, IBM ILOG CPLEX solver may be implemented to solve the VM packing formulation of equation (1).

In another embodiment, the first-fit principle may be implemented to solve the formulation of the VM packing. The first-fit principle may be implemented as in pseudocode 1.

| Pseudocode 1: first-fit principle |
|---|
| while (there is an unassigned VM i) {<br>    find a server j that can accommodate VM i<br>    put VM i onto server j<br>} |

In accordance with the present principles, the step of "finding a server j that can accommodate VM i" in pseudocode 1 may be implemented by checking whether the server j can accommodate its allocated VMs, including VM i, for all resource levels (e.g., first and second resource levels). Other implementations for solving the VM packing formulation are also contemplated.

Figure 3:
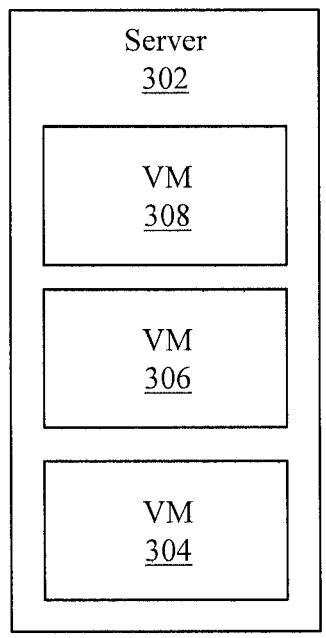
FIG. 3 is a block/flow diagram showing a server implementing a number of virtual machines, in accordance with one illustrative embodiment.

Referring for a moment to FIG. 3, multiple VMs are packed in a single server in accordance with one illustrative embodiment. The present principles are applied for VM packing of VMs 304, 306, 308 onto server 302. The VMs 304, 306, 308 are consolidated into a single server 302 such that the first resource level may be allocated to any one of the VMs 304, 306, 308 while the second resource level is allocated to the remaining VMs without exceeding the resource capacity of the server 302. In this example, the first resource level is the maximum CPU usage and the second resource level is the 98th percentile of the maximum CPU usage for its respective VM. The VMs 304, 306, 308 are packed onto the server 302 such that CPU usage does not exceed the capacity of the server 302 in ALL possible scenarios: 1) VM 304 at 98th percentile of its maximum CPU usage, VM 306 at 98th percentile of its maximum CPU usage, and VM 308 at maximum CPU usage; 2) VM 304 at 98th percentile of its maximum CPU usage, VM 306 at maximum CPU usage, and VM 308 at 98th percentile of its maximum CPU usage; and 3) VM 304 at maximum CPU usage, VM 306 at 98th percentile of its maximum CPU usage, and VM 308 at 98th percentile of its maximum CPU usage.

Referring now to FIG. 4, a block/flow diagram showing a method 400 for VM packing is illustratively depicted in accordance with one illustrative embodiment. In block 402, a plurality of resource usage levels are provided for a set of VMs to be consolidated. Resource usage levels may represent any resource, including, e.g., CPU usage, disk input/output bandwidth, network bandwidth, etc. The plurality of resource usage levels may include any number of resource usage levels, but preferably two resource levels: first and last resource levels. Additional resource levels are also contemplated within the scope of the present principles. The values of the plurality of resource levels may include a maximum resource usage for its respective VM, 98th percentile of the maximum resource usage, 95th percentile of the maximum resource usage, etc. Other values of resource levels are also contemplated.

In block 404, an optimization problem is formulated to minimize an objective function based upon the plurality of resource usage levels. Minimizing an objective function may include minimizing a number of servers, minimizing total energy usage, etc. Preferably, the optimization problem includes an MIP problem. However, other formulations are also contemplated. The formulations are based upon the assumption that since resource usage is typically low and only peaks for a very short time, only one VM at a time will peak. In block 406, the optimization problem is formulated such that any of one or more VMs of a set of VMs to be allocated to a target server may be assigned to the first resource level and remaining VMs of the set may be assigned to the last resource level such that a resource capacity of the target server is not exceeded.

In block 408, the set of VMs is allocated to the number of servers in accordance with the formulating to consolidate the set of VMs. Allocating the set of VMs preferably includes solving the optimization problem to determine an allocation of the set of VMs onto the number of servers. Solving the optimization problem may include applying known solvers. For example, IBM ILOG CPLEX solver may be implemented to solve the formulation. Other embodiments are also contemplated.

Having described preferred embodiments of a system and method for low-risk server consolidation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for virtual machine (VM) consolidation, comprising:
providing a plurality of resource usage levels for a set of VMs to be consolidated including a first resource usage level, a last resource usage level, and intervening resource usage levels of a target server;
formulating an optimization problem, using a processor, to minimize an objective function such that any of one or more VMs of a set of VMs to be allocated to the target server are assigned to the first resource usage level which includes a maximum resource usage level for the assigned VM and remaining VMs of the set are assigned to the last resource usage level which includes less than the maximum resource usage level for the assigned VM while not exceeding a resource capacity of the target server and while ignoring the intervening resource usage levels for allocation; and
allocating the set of VMs to the target server in accordance with the optimization problem to consolidate the set of VMs.

2. The method as recited in claim 1, wherein providing the plurality of resource usage levels includes providing the plurality of resource usage levels for at least one of processor usage, disk input/output bandwidth, and network bandwidth.

3. The method as recited in claim 1, wherein formulating the optimization problems includes formulating a mixed integer programming problem.

4. The method as recited in claim 1, wherein the optimization problem minimizes at least one of a number of servers and total energy usage.

5. The method as recited in claim 1, wherein allocating includes solving the optimization problem to determine an allocation of the set of VMs onto the target server.

6. A non-transitory computer readable storage medium comprising a computer readable program for virtual machine (VM) consolidation, wherein the computer readable program when executed on a computer causes the computer to perform the steps of:
providing a plurality of resource usage levels for a set of VMs to be consolidated including a first resource usage level, a last resource usage level, and intervening resource usage levels of a target server;
formulating an optimization problem to minimize an objective function such that any of one or more VMs of a set of VMs to be allocated to the target server are assigned to the first resource usage level which includes a maximum resource usage level for the assigned VM and remaining VMs of the set are assigned to the last resource usage level which includes less than the maximum resource usage level for the assigned VM while not exceeding a resource capacity of the target server and while ignoring the intervening resource usage levels for allocation; and
allocating the set of VMs to the target server in accordance with the optimization problem to consolidate the set of VMs.

7. The non-transitory computer readable storage medium as recited in claim 6, wherein providing the plurality of resource usage levels includes providing the plurality of resource usage levels for at least one of processor usage, disk input/output bandwidth, and network bandwidth.

8. The non-transitory computer readable storage medium as recited in claim 6, wherein formulating the optimization problems includes formulating a mixed integer programming problem.

9. The non-transitory computer readable storage medium as recited in claim 6, wherein allocating includes solving the optimization problem to determine an allocation of the set of VMs onto the target server.

10. A system for virtual machine (VM) consolidation, comprising:
a processor; and
a memory coupled to the processor including:
a formulation module, formulating formulates an optimization problem on a non-transitory computer readable storage medium to minimize an objective function based upon a plurality of resource usage levels including a first resource usage level, a last resource usage level, and intervening resource usage levels of a target server, wherein the optimization problem is formulated such that any of one or more VMs of a set of VMs to be allocated to the target server are assigned to the first resource usage level which includes a maximum resource usage level for the assigned VM and remaining VMs of the set are assigned to the last resource usage level which includes less than the maximum resource usage level for the assigned VM while not exceeding a resource capacity of the target server and while ignoring the intervening resource usage levels for allocation; and an allocation module allocates the set of VMs to the target server in accordance with the optimization problem to consolidate the set of VMs.

11. The system as recited in claim 10, wherein the plurality of resource usage levels includes the plurality of resource usage levels for at least one of processor usage, disk input/output bandwidth, and network bandwidth.

12. The system as recited in claim 10, wherein the formulation module formulates a mixed integer programming problem.

13. The system as recited in claim 10, wherein the optimization problem minimizes at least one of a number of servers and total energy usage.

14. The system as recited in claim 10, wherein the allocation module solves the optimization problem to determine an allocation of the set of VMs onto the target server.

\* \* \* \* \*